United States Patent [19]

Metcalf

[11] Patent Number: 4,901,746
[45] Date of Patent: Feb. 20, 1990

[54] ANTICIPATING OVERSPEED GOVERNOR

[75] Inventor: Jeffrey D. Metcalf, Albion, Ill.

[73] Assignee: Sundstrand Corporation, Rockford, Ill.

[21] Appl. No.: 211,876

[22] Filed: Jun. 27, 1988

[51] Int. Cl.⁴ ............................................. G05D 13/34
[52] U.S. Cl. ...................................... 137/48; 73/512; 416/36
[58] Field of Search ....................... 73/512; 137/48, 56; 416/36, 45

[56] References Cited

U.S. PATENT DOCUMENTS

| | | | |
|---|---|---|---|
| 350,595 | 10/1886 | Marks | 137/48 |
| 2,472,181 | 6/1949 | Werth | 73/512 X |
| 2,816,749 | 12/1957 | Oberle | 73/512 |
| 2,975,794 | 3/1961 | Fischer | 137/48 |
| 3,322,471 | 5/1967 | Faiver et al. | |
| 3,370,600 | 2/1968 | Peterson | |
| 3,831,615 | 8/1974 | Hartzell | |
| 3,945,199 | 3/1976 | Bradley et al. | |
| 3,955,424 | 5/1976 | Williams | |
| 4,123,942 | 11/1978 | Rumyantsev | |
| 4,164,235 | 8/1979 | Benson | |

FOREIGN PATENT DOCUMENTS 674192  6/1952  United Kingdom ................. 73/512

*Primary Examiner*—Robert G. Nilson
*Attorney, Agent, or Firm*—Antonelli, Terry & Wands

[57] ABSTRACT

A speed responsive control device is useful for preventing a dangerous overspeed condition of a propulsor. The device begins governing before the dangerous overspeed condition occurs through the use of an acceleration responsive mechanism which actuates the spool of a governor pilot valve. The spool is also actuated by a speed responsive mechanism in the form of a flyweight governor. The control device thus anticipates dangerous overspeed conditions to make necessary adjustments such as blade pitch corrections, to prevent a dangerous overspeed condition.

5 Claims, 1 Drawing Sheet

ANTICIPATING OVERSPEED GOVERNOR

TECHNICAL FIELD

The present invention is directed to a speed responsive control device and a method of operating such device. In particular, the invention relates to an overspeed governor for adjusting the blade pitch of a propulsor of an aircraft engine.

BACKGROUND ART

In unducted fan propulsor engines for aircraft, the pitch of the propulsor blades is adjustable to prevent propulsor overspeed. With such systems, an overspeed governor is required to prevent propulsor overspeed in the event of normal electronic control failure. Due to the high torque inertia ratio of the propulsor, rapid accelerations of the propulsor are possible. Normal flyweight governors can not respond fast enough to prevent a dangerous overspeed condition. Therefore, governing is required to begin before the normal point when rapid accelerations are present.

DISCLOSURE OF INVENTION

An object of the present invention is to provide an improved speed responsive control device and a method of operating such device which solves the aforementioned problem. More particularly, an object of the invention is to provide an improved overspeed governor for adjusting the blade pitch of a propulsor of an aircraft engine which can respond quickly when there is a rapid acceleration of the propulsor so as to make the necessary blade pitch correction and prevent a dangerous overspeed condition.

These and other objects of the invention are attained by the improved speed responsive control device of the invention which comprises speed responsive means for actuating a member as a function of the speed of movement of the speed responsive means, and acceleration responsive means for actuating the member as a function of the acceleration of the speed responsive means. Coupling means is provided for moving the acceleration responsive means with the speed responsive means. The coupling means includes the member which is actuated as a function of the speed of movement of the speed responsive means and as a function of the acceleration of the speed responsive means by the acceleration responsive means. The coupling means further includes means for actuating the member in the same direction in response to the acceleration of the speed responsive means with a change in the direction of motion of the speed responsive means.

The disclosed, preferred embodiment of the invention is an overspeed governor for adjusting the blade pitch of the propulsor of an aircraft engine comprising a flyweight governor which is rotated in response to rotation of the propulsor, a governor pilot valve with a spool valve which is axially moved in response to changes in the speed of movement of the propulsor and flyweight governor for adjusting the blade pitch of the propulsor and acceleration responsive means for axially moving the spool valve in response to acceleration of the propulsor and flyweight governor. The acceleration responsive means includes a flywheel adapted to be rotated with the valve spool and cam means between the flywheel and the valve spool for axially moving the valve spool in response to an acceleration of the flyweight governor. The cam means includes at least one cam slot in one of the flywheel and the valve spool and at least one follower in the other of the flywheel and the valve spool, the cam follower extending into the cam slot. The cam slot extends at an angle with respect to the longitudinal axis of the valve spool so that relative rotation between the flywheel and the valve spool upon acceleration results in an axial translation of the valve spool as the flywheel is held in an axially fixed position.

Means are also provided for adjusting the cam means for axially moving the valve spool in the same direction in response to an acceleration of the propulsor and flyweight governor with a change in the direction of rotation of the flyweight governor and valve spool. This is accomplished using a second cam slot extending in a direction at right angles to the first cam slot and means for adjusting the flywheel and spool valve relative to one another so that the cam follower is adjustably positioned in a selected one of the two cam slots in accordance with the direction of rotation.

These and other objects, features and advantages of the present invention will become more apparent from the following description when taken in connection with the accompanying drawings, which show, for purposes of illustration only, one embodiment in accordance with the present invention.

BEST MODE FOR CARRYING OUT THE INVENTION

Figure 1:
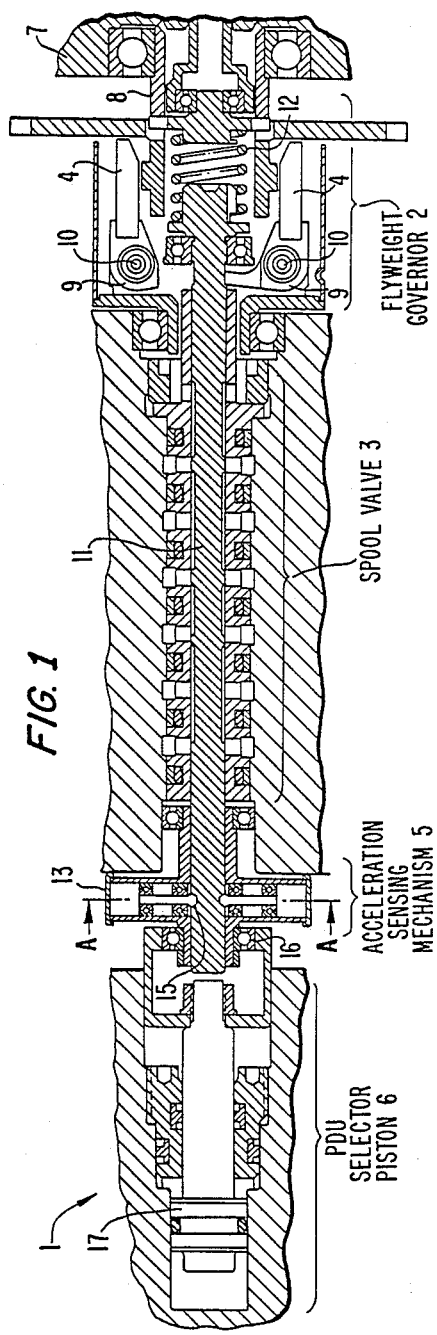
FIG. 1 is a cross-sectional view taken along the longitudinal axis of an anticipating overspeed governor for adjusting the blade pitch of a propulsor of an aircraft engine according to the invention.
Figure 3:
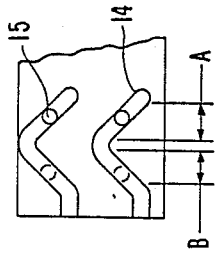
FIG. 3 is a plan view of a portion of the surface of the spool of the valve illustrating the locations and directions of the cam slots in the spool.
Figure 2:
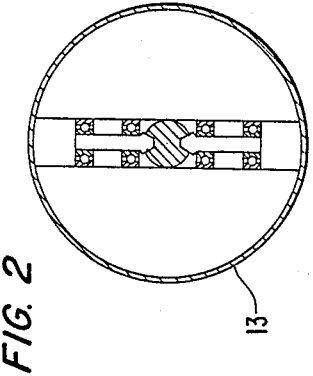
FIG. 2 is a cross-sectional view through the flywheel and spool valve of the overspeed governor of FIG. 1 taken along the line A—A.

Referring now to the drawings, an anticipating overspeed governor 1 of the invention as illustrated in FIGS. 1-3 is seen to comprise four major components. Namely, a flyweight governor 2 a hydraulic spool valve 3 that is actuated by the flyweights 4 of the flyweight governor 2, a flywheel acceleration sensing mechanism 5 that also actuates the spool valve 3 and a power drive unit (PDU) selector piston or mode selector mechanism 6.

The flyweight governor 2 is rotated with a propulsor 7, shown only partially, of an unducted fan propulsor engine for an aircraft through a driving connection generally indicated at eight. The flyweights 4 of the governor 2 tend to move radially outward with increasing velocity of rotation causing the associated arms 9 to pivot about pivots 10 and, in turn, axially move a spool 11 of the hydraulic spool valve 3 to the right as shown in FIG. 1 against the bias of a spring 12. The axial movement of the spool 11 within the valve 3 controls the flow of hydraulic fluid for adjusting the pitch of the propulsor 7 to make the necessary blade pitch corrections in response to the sensed speed.

The spool 11 of the valve 3 rotates with the flyweights 4 of the governor 2 through the spring 12 to minimize the spool drag and improve accuracy. The rotation of the spool 11 is transmitted to a flywheel 13 of the flywheel acceleration sensing mechanism 5 by way of a cam slot 14 formed in the outer peripheral surface of the spool 11 and a cam follower 15 mounted in the flywheel 13. When the spool 11 accelerates, torque is imparted to the flywheel 13 to accelerate it through the cam slot 14 and cam follower 15. Because the cam slot is directed at an angle with respect to the longitudinal axis of the spool 11 and the fact that the flywheel 13 is prevented from moving axially by a bearing 16 which is held in place by fluid pressure on a piston 17 of the PDU selector piston 6, the acceleration torque causes an axial force to be imparted to the spool 11 in a direction that adds to the flyweight force from the flyweight governor 2. The effect of the acceleration sensing mechanism 5 then is to govern the hydraulic spool valve 3 to begin the necessary blade pitch corrections before the speed governing caused by the flyweight governor 2 thus "anticipating" an overspeed condition in time to make the necessary blade pitch corrections and prevent a dangerous overspeed condition.

The PDU selector piston 6 permits the axial displacement of the flywheel acceleration sensing mechanism with respect to the spool 11 so that the cam follower 15 can be selectively positioned in respective portions of the cam slot which are angled in opposite directions. This movement is accomplished by changing the respective sides of the piston 17 which are subjected to control pressure and to a return. That is, the cam follower is allowed to selectively operate on either section A or section B of the cam. This in effect changes the arithmetic sign of the acceleration sensing, allowing acceleration to be properly sensed for opposite rotation of the governor.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A speed responsive control device comprising speed responsive means for activating a member as a function of the speed of movement of said speed responsive means, acceleration responsive means for activating said member as a function of the acceleration of said speed responsive means, coupling means for moving the acceleration responsive means with the sp-ed responsive means, said coupling means including said member, wherein the movement of said speed responsive means is rotary movement, said coupling means rotating the acceleration responsive means with the speed responsive means, wherein said acceleration responsive means includes a flywheel adapted to be rotated with said member of said coupling means and cam means between said flywheel and said member for axially moving said member in response to an acceleration of said speed responsive means, wherein said cam means includes at least one cam slot in one of said flywheel and said member and at least one cam follower on the outer of said flywheel and said member and extending into said cam slot, said at least one cam slot including respective portions which are angled in opposite directions, and means for adjusting the axial position of the flywheel with respect to the member for positioning the at least one cam follower in a selected one of said respective angled portions of the at least one cam slot depending upon the direction of rotation of said speed responsive means, member and flywheel.

2. The speed responsive control device according to claim 1, wherein said member is a spool of a valve, said spool being axially positioned as a function of the speed of rotation of said speed responsive means 3. The speed responsive control device according to claim 1, wherein said speed responsive means is a flyweight governor which is mounted for rotation, said member being actuated as a function of the speed of rotation of said governor.

4. The speed responsive control device according to claim 1, wherein said member is a spool of a valve.

5. A speed responsive control device according to claim 1, said control device is an overspeed governor for adjusting the blade pitch of a propulsor of an aircraft engine.

* * * * *